Patented Oct. 2, 1934

1,975,731

UNITED STATES PATENT OFFICE 1,975,731

METHOD OF TREATING PSYLLIUM SEEDS

John Frederick Parsons, Washington, D. C., assignor to National Vaccine and Antitoxin Institute, a corporation of District of Columbia No Drawing. Application August 17, 1933, Serial No. 685,647

2 Claims. (Cl. 209—6)

This invention relates to methods of treating seeds or grains, and particularly psyllium seed.

The principal object of the invention is to treat psyllium seed so that the gelatinous-forming coating will be removed without crushing the woody interior and reduce said coating to a powder-like consistency.

In recent years the use of psyllium seed as an intestinal lubricant has grown to tremendous proportions. When water is added to the seed a jelly-like substance forms on the outside. This substance is inert so far as digestion is concerned and its water content is not readily absorbed by the human system, consequently the seeds, mixing with the intestinal content, give it bulk and keep it soft. As the seed possesses no food value it can be used by practically all persons without danger of increasing weight, and since it is inert its users are in no danger of becoming addicted to habit-forming laxatives or purgatives.

However, the whole seeds are objectionable to many people. Some find them hard to swallow and many have experienced impaction of the seeds in their intestinal tracts.

It has been sought to develop a method of separating the gelatinous forming coating from the woody center without crushing said woody interior of the seed and mixing the two portions, but on account of the comparatively small size of the seed and for other reasons these efforts, up to the discovery of my method, have not met with success.

After repeated experiments and subjecting psyllium seed to many types of apparatus, I have discovered a method by which the outer shell of the seed can be removed and separated from the woody interior. My method is to subject the seeds to the rapid blows of the hammers of a hammer mill. The seeds are fed into a mill equipped with a screen containing holes about one-eighth inch in diameter, several times as large as the seeds. The hammers, revolving at a speed of 3000 to 4000 revolutions per minute, remove and comminute the coating of some of the seeds. The hammer mill heretofore has been used for the purpose of disintegrating seeds or other substances that are larger than the holes of the screen through which the particles of seeds or other substances eventually pass. As previously stated, due to my employment of a screen with much larger holes, the seeds treated in accordance with my method are prevented from remaining in the mill long enough to be broken up.

By running the seeds through the mill three times the mucilaginous coatings of nearly all the seeds are removed while the woody centers remain intact.

The product is then sifted through a fifty-mesh screen to separate the coatings, now reduced to a powder, from the woody centers.

Aside from the improvement in the product, my method brings about a marked saving in the bulk of the material. In other words, by the methods in vogue prior to my discovery, it required about three times as much of the whole or ground seed to equal one part of the meal produced by my method.

I claim as my invention:

1. The process of producing powder from seeds known as psyllium seeds comprising subjecting said seeds to impactive forces adjusted to remove the gelatinous forming coatings of the seeds without substantially disintegrating the hard centers of the seeds, then subjecting the so-treated seeds to size separation and thereby collecting the removed gelatinous forming coatings as a powdered mass separately from the hard centers.

2. The process of producing powder from seeds known as psyllium seeds comprising repeatedly subjecting said seeds to impactive forces adjusted to remove the gelatinous forming coatings of the seeds without substantially disintegrating the hard centers of the seeds, then subjecting the so-treated seeds to size separation and thereby collecting the removed gelatinous forming coatings as a powdered mass separately from the hard centers.

JOHN FREDERICK PARSONS.